US010147962B2

(12) United States Patent
Yokoi et al.

(10) Patent No.: US 10,147,962 B2
(45) Date of Patent: Dec. 4, 2018

(54) METHOD FOR PRODUCING FUEL CELL MEMBRANE ELECTRODE ASSEMBLY

(71) Applicant: HONDA MOTOR CO., LTD., Tokyo (JP)

(72) Inventors: Mai Yokoi, Tochigi (JP); Kazuhide Matsuo, Tochigi (JP); Shunsuke Konishi, Tochigi (JP); Yuichi Hori, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/460,742

(22) Filed: Mar. 16, 2017

(65) Prior Publication Data
US 2017/0271699 A1 Sep. 21, 2017

(30) Foreign Application Priority Data
Mar. 18, 2016 (JP) .................. 2016-055713

(51) Int. Cl.
*H01M 8/1069* (2016.01)
*H01M 4/88* (2006.01)
(Continued)

(52) U.S. Cl.
CPC .......... *H01M 8/1069* (2013.01); *B32B 3/266* (2013.01); *B32B 5/16* (2013.01); *B32B 7/04* (2013.01);
(Continued)

(58) Field of Classification Search
CPC ........ H01M 8/02; H01M 8/10; H01M 8/1004; H01M 4/8875; H01M 8/1069; H01M 4/88;
(Continued)

(56) References Cited

U.S. PATENT DOCUMENTS 5,752,988 A    5/1998  Okamoto et al.
5,761,793 A *  6/1998  Bevers ............... H01M 8/1004
                                                29/623.3
(Continued)

FOREIGN PATENT DOCUMENTS

JP         3273591       2/2002
JP      2008258142 A  * 10/2008
(Continued)

OTHER PUBLICATIONS

Search report for JP20160055713.*
(Continued)

*Primary Examiner* — Sonya M Sengupta
(74) *Attorney, Agent, or Firm* — Rankin, Hill & Clark LLP

(57) ABSTRACT

To provide a method for producing a fuel cell membrane electrode assembly that can prevent the required catalyst layer from being removed, while suppressing damage to the electrolyte membrane. A method for producing a fuel cell membrane electrode assembly MEA includes: a step of bonding a polymer electrolyte membrane PEM and a first catalyst layer-including substrate GDE1; a step of making a cut CL so that the first catalyst layer-including substrate GDE bonded with the polymer electrolyte membrane PEM becomes a predetermined shape; a step of peeling an unwanted portion GDE12 of the first catalyst layer-including substrate GDE1 from the polymer electrolyte membrane PEM; a step of irradiating a laser beam LB2 penetrating the polymer electrolyte membrane PEM without penetrating the first catalyst layer-including substrate GDE1 onto the polymer electrolyte membrane PEM, and removing residue RD of the first catalyst layer-including substrate GDE1 adhering on the polymer electrolyte membrane PEM.

2 Claims, 4 Drawing Sheets

(51) Int. Cl.
| | |
|---|---|
| *B32B 25/00* | (2006.01) |
| *B32B 37/10* | (2006.01) |
| *B32B 37/18* | (2006.01) |
| *H01M 8/1004* | (2016.01) |
| *B32B 5/16* | (2006.01) |
| *B32B 7/04* | (2006.01) |
| *B32B 27/10* | (2006.01) |
| *B32B 27/14* | (2006.01) |
| *B32B 37/00* | (2006.01) |
| *B32B 38/00* | (2006.01) |
| *B32B 38/10* | (2006.01) |
| *B32B 3/26* | (2006.01) |
| *B32B 37/14* | (2006.01) |
| *H01M 8/02* | (2016.01) |
| *H01M 8/10* | (2016.01) |

(52) U.S. Cl.
CPC ............ *B32B 25/00* (2013.01); *B32B 27/10* (2013.01); *B32B 27/14* (2013.01); *B32B 37/0053* (2013.01); *B32B 37/10* (2013.01); *B32B 37/182* (2013.01); *B32B 38/0004* (2013.01); *B32B 38/10* (2013.01); *H01M 4/88* (2013.01); *H01M 4/881* (2013.01); *H01M 4/8825* (2013.01); *H01M 8/1004* (2013.01); *B32B 37/14* (2013.01); *B32B 2250/44* (2013.01); *B32B 2260/021* (2013.01); *B32B 2260/025* (2013.01); *B32B 2260/046* (2013.01); *B32B 2262/106* (2013.01); *B32B 2264/105* (2013.01); *B32B 2264/108* (2013.01); *B32B 2307/20* (2013.01); *B32B 2307/40* (2013.01); *B32B 2310/0843* (2013.01); *B32B 2457/18* (2013.01); *H01M 4/8875* (2013.01); *H01M 8/02* (2013.01); *H01M 8/10* (2013.01); *Y02P 70/56* (2015.11)

(58) Field of Classification Search
CPC ..... H01M 4/881; H01M 4/8825; Y02P 70/56; B32B 2457/18; B32B 37/14; B32B 38/10; B32B 25/00; B32B 27/10; B32B 27/14; B32B 3/266; B32B 37/0053; B32B 37/10; B32B 37/182; B32B 38/0004; B32B 5/16; B32B 7/04
USPC ................ 156/250, 267, 272.2, 272.8, 273.7
See application file for complete search history.

(56) References Cited

U.S. PATENT DOCUMENTS

2008/0145712 A1* 6/2008 Pierpont ............... B32B 37/203
  429/509
2008/0314512 A1* 12/2008 Bartsch ............... B32B 37/1284
  156/258

FOREIGN PATENT DOCUMENTS

| JP | 2010-119967 | 6/2010 |
|---|---|---|
| JP | 5611604 | 9/2014 |

OTHER PUBLICATIONS

Decision for Patent Grant for JP20160055713.*
U.S. Office Action dated Feb. 9, 2018, from U.S. Appl. No. 15/460,720, 14 pages.
Japanese Search Report (English Translation), JP 2016-055713, dated Aug. 17, 2017, 11 pages.
Japanese Office Action(English Translation), JP 2016-055713, dated Aug. 21, 2017, 4 pages.

* cited by examiner

METHOD FOR PRODUCING FUEL CELL MEMBRANE ELECTRODE ASSEMBLY

This application is based on and claims the benefit of priority from Japanese Patent Application No. 2016-055713, filed on 18 Mar. 2016, the content of which is incorporated herein by reference.

BACKGROUND OF THE INVENTION

Field of the Invention

The present invention relates to a method for producing a fuel cell membrane electrode assembly in which electrode layers are laminated on both surfaces of an electrolyte membrane.

Related Art

The membrane electrode assembly (MEA) of a fuel cell has a structure made by a catalyst layer and diffusion layer (collectively "electrode layer") being laminated on both surfaces to sandwich an electrolyte membrane, as described in Patent Document 1, for example. In addition, one electrode layer, in order to assume a creepage distance for ensuring insulation between the electrode layers on both surfaces, is configured so that the electrolyte membrane is exposed at the peripheral edge.

As a method of producing such an MEA, there is a method of forming a catalyst layer on a diffusion layer substrate, and then bonding this to the electrolyte membrane, as described in Patent Document 2.

On the other hand, in order to raise the production efficiency of MEAs, it has been proposed to continuously produce the MEA in a roll-to-roll method as shown in Patent Document 3.

Patent Document 1: Japanese Patent No. 5611604
Patent Document 2: Japanese Patent No. 3273591
Patent Document 3: Japanese Unexamined Patent Application, Publication No. 2010-119967

SUMMARY OF THE INVENTION

However, when trying to produce MEAs by bonding the catalyst layer-including diffusion layer described in Patent Document 2 to the electrolyte membrane by way of a roll-to-roll method, the following such sequence is considered. First, the lamination/bonding of the catalyst layer-including diffusion layer unrolled from a catalyst layer-including diffusion layer roll is performed on one side or both sides of the electrolyte membrane unrolled from the electrolyte membrane roll. Then, an excess portion of the catalyst layer-including diffusion layer is peeled from the membrane layer, and the electrolyte layer and catalyst layer-including diffusion layer is further cut into a predetermined shape to complete the MEA.

However, if peeling from the electrolyte layer the catalyst layer-including diffusion layer made by provisionally bonding as mentioned above, there is a risk of not removing the entirety of the catalyst layer, and residue of the catalyst layer remaining on the catalyst layer. There is a risk of the residue thereby remaining causing the insulation property and gas sealing property to decline.

In order to remove such residue of the catalyst layer, it has been considered to irradiate a laser beam onto the remaining region of residue. However, if the absorption coefficient of this laser beam to the electrolyte membrane is high, it will cause damage to the electrolyte membrane. Furthermore, in the case of the catalyst layer being formed on the other surface of the electrolyte membrane, the catalyst layer on the other surface will also be removed upon residue removal.

The present invention has an object of providing a method for producing a fuel cell membrane electrode assembly that can prevent a required catalyst layer from being removed, while suppressing damage to the electrolyte membrane.

In order to achieve the above-mentioned objects, the present invention provides method for producing a fuel cell membrane electrode assembly including: a step of preparing an electrolyte membrane (e.g., the polymer electrolyte membrane PEM described later) (for example, Step 1 described later); a step of preparing a catalyst layer-including substrate (for example, the first catalyst layer-including substrate GDE1 described later) in which a first catalyst layer (for example, the first catalyst layer 111 described later) is formed on one face of a sheet-like substrate (for example, Step 2 described later); a step of laminating the catalyst layer-including substrate so that the first catalyst layer opposes one face of the electrolyte membrane (for example, Step 3 described later); a step of bonding the electrolyte membrane and the catalyst layer-including substrate (for example, Step 4 described later); a step of making a cut (for example, the cut CL described later) so that the catalyst layer-including substrate bonded with the electrolyte membrane becomes a predetermined shape (for example, Step 5 described later); a step of peeling an unwanted portion (for example, the unwanted portion GDE12 described later) of the catalyst layer-including substrate other than the predetermined shape portion (for example, the portion of predetermined shape GDE11 described later) from the electrolyte membrane (for example, Step 6 described later); a step of irradiating energy rays (for example, the laser beam LB2 described later) that penetrate the electrolyte membrane without penetrating the catalyst layer-including substrate onto a portion of the electrolyte membrane to which the unwanted portion is bonded, and removing residue (for example, the residue RD described later) of the catalyst layer-including substrate adhering on the electrolyte membrane (for example, Step 7 described later); and a step of forming a second catalyst layer (for example, the second catalyst layer 121 described later) on one other face of the electrolyte membrane, and punching out the electrolyte membrane and the second catalyst layer so that the catalyst layer-including substrate of the predetermined shape bonded to the one face is surrounded (for example, Step 8 described later).

In the present invention, first, after bonding the catalyst layer-including substrate only to one face of the electrolyte membrane, the unwanted portion is peeled, the residue is removed using energy rays such as a laser beam that penetrates the electrolyte membrane without penetrating the catalyst layer-including substrate, and then forms the catalyst layer on the other face. Since the catalyst layer is formed on the other face after removing the residue in this way, this catalyst layer will not be removed by the energy rays penetrating the electrolyte membrane. Therefore, according to the present invention, it is possible to prevent the required catalyst layer from being removed while suppressing damage to the electrolyte film.

In the aforementioned invention, the energy rays preferably have transmittance relative to the electrolyte membrane of at least 80%.

The present invention uses energy rays having transmittance relative to the electrolyte membrane of at least 80%. It is thereby possible to more reliably suppress damage to the electrolyte membrane by using high-transmittance energy rays.

According to the present invention, it is possible to provide a method for producing a fuel cell membrane electrode assembly that can prevent a required catalyst layer from being removed, while suppressing damage to the electrolyte membrane.

DETAILED DESCRIPTION OF THE INVENTION

Figure 1:
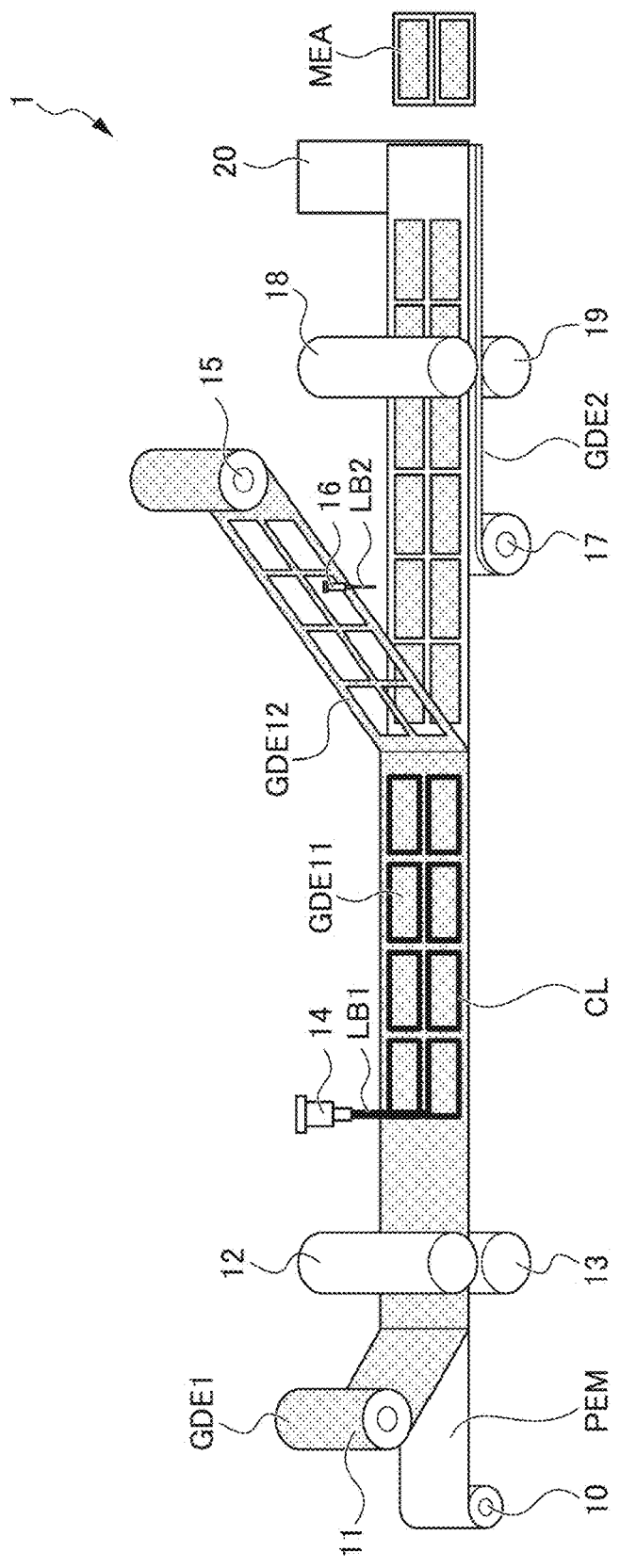
FIG. 1 is a schematic view showing a production line 1 for a fuel cell membrane electrode assembly MEA according to an embodiment of the present invention.
Figure 2:
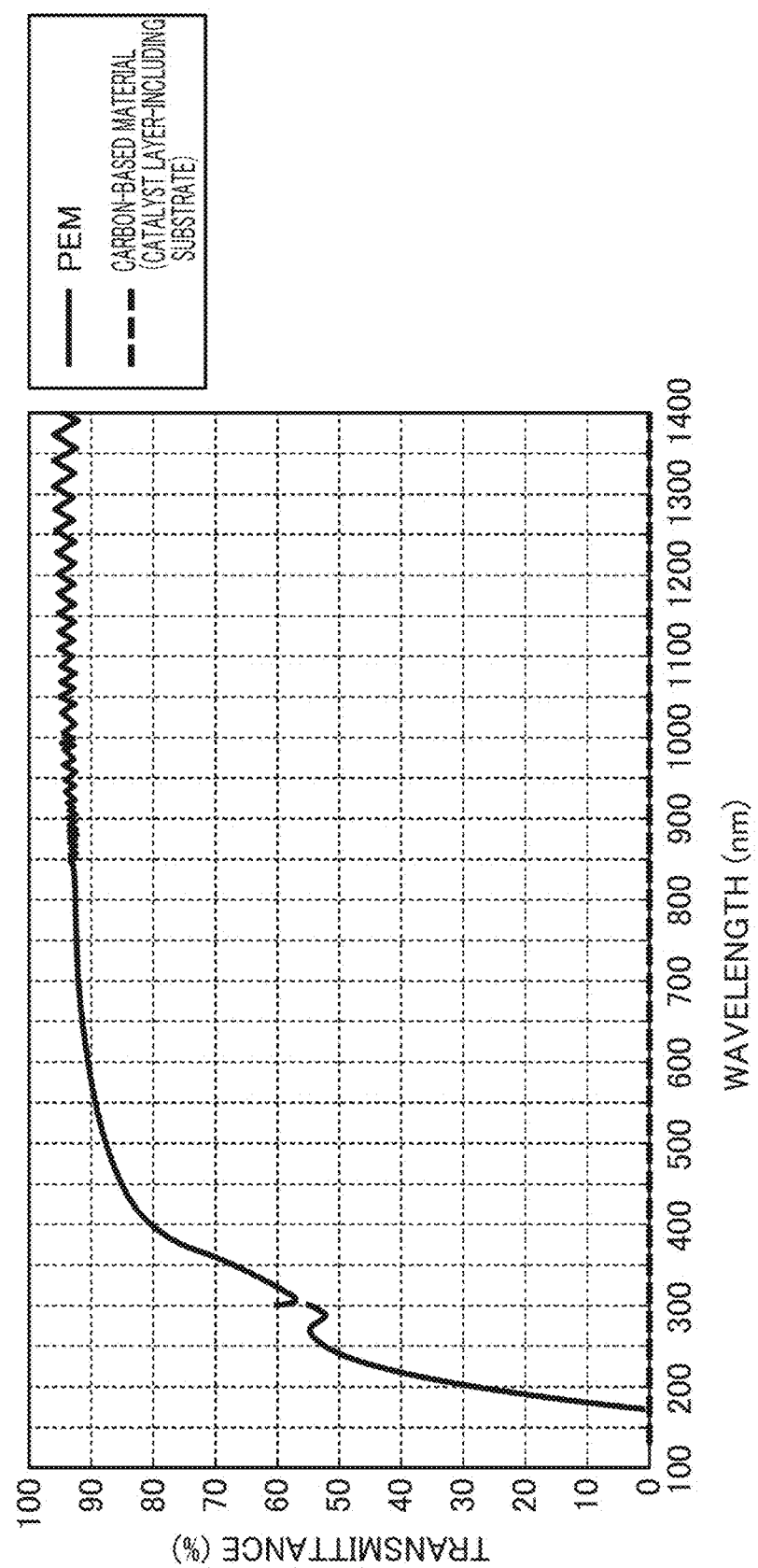
FIG. 2 is a graph showing a relationship between wavelength and transmittance of a laser beam LB2 of a second laser device 16.
Figure 3A:
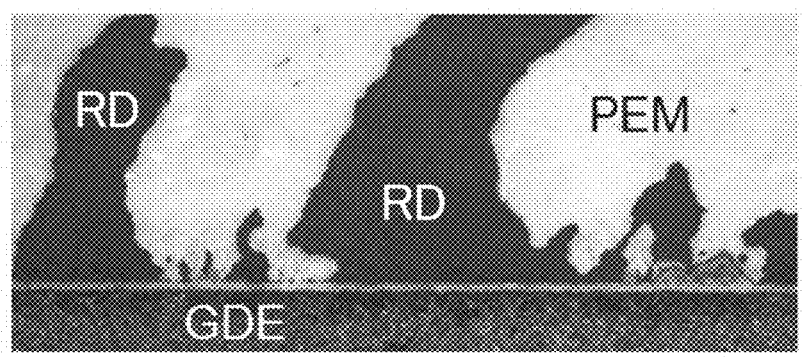
FIG. 3A is an enlarged top view showing a state after peeling an unwanted portion GDE 12 of a first catalyst layer-including substrate GDE1 from an electrolyte membrane PEM, and prior to removing residue RD.
Figure 3B:
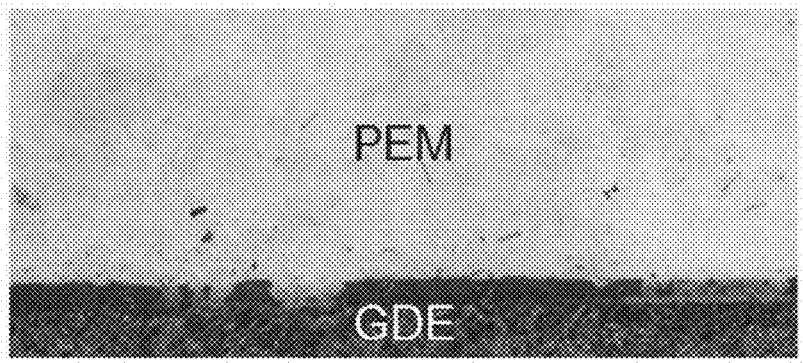
FIG. 3B is an enlarged top view showing a state after peeling an unwanted portion GDE12 of a first catalyst layer-including substrate GDE1 from an electrolyte membrane PEM, and after removing the residue RD.
Figure 4:
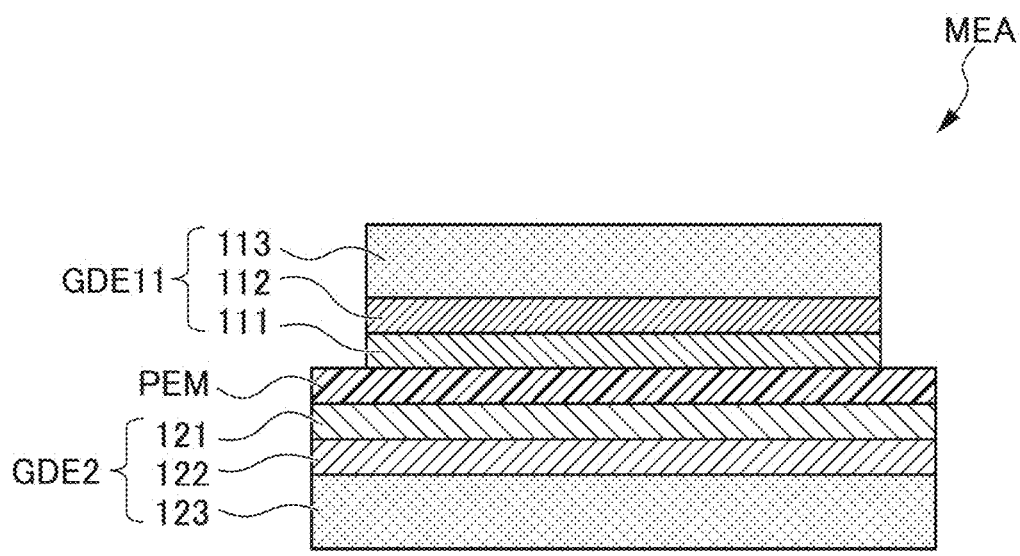
FIG. 4 is a cross-sectional view of a membrane electrode assembly MEA for a fuel cell thus produced.
Figure 5:
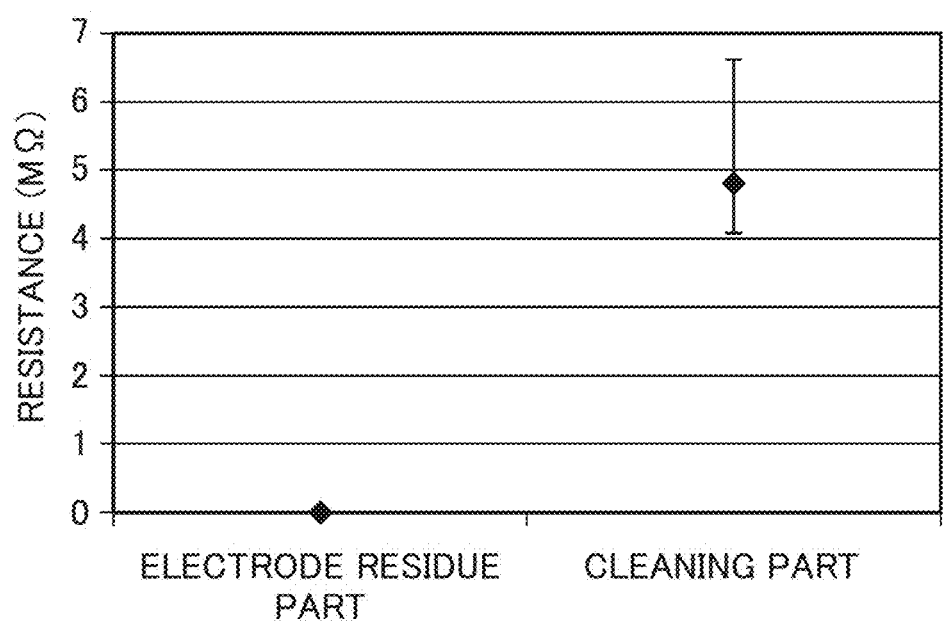
FIG. 5 is a graph comparing the insulation property before and after removing the residue RD of the first catalyst layer-including substrate GDE1 from over the electrolyte membrane PEM.

An embodiment of the present invention will be explained in detail while referencing the drawings. FIG. 1 is a schematic view showing a production line 1 of a membrane electrode assembly MEA for a fuel cell according to the embodiment of the present invention. FIG. 2 is a graph showing a relationship between wavelength and transmittance of a laser beam LB2 of a second laser device 16. FIG. 3A is an enlarged top view showing a state after peeling an unwanted portion GDE 12 of a first catalyst layer-including substrate GDE1 from an electrolyte membrane PEM, and prior to removing residue RD. FIG. 3B is an enlarged top view showing a state after peeling the unwanted portion GDE12 of the first catalyst layer-including substrate GDE1 from the electrolyte membrane PEM, and after removing the residue RD. FIG. 4 is a cross-sectional view of a membrane electrode assembly MEA for a fuel cell thus produced. FIG. 5 is a graph comparing the insulation property before and after removing the residue RD of the first catalyst layer-including substrate GDE1 from over the electrolyte membrane PEM.

The production line 1 of the fuel cell membrane electrode assembly (Membrane Electrode Assembly) MEA shown in FIG. 1 raises the production efficiency of the fuel cell membrane electrode assembly MEA by making continuous with a roll-to-roll method. More specifically, the production line 1 of the fuel cell membrane electrode assembly MEA includes: an electrolyte membrane roll 10; a first substrate roll 11; a pair of upper/lower temporary bonding rolls 12, 13; a first laser device 14; a recovery roll 15; a second laser device 16; a second substrate roll 17; a pair of upper/lower bonding rolls 18, 19; a cutter 20; etc.

The electrolyte membrane roll 10 is a roll that prepares a continuous sheet-like (belt-like) polymer electrolyte membrane PEM, and rotates around a horizontal shaft at the upstream of the production line 1. This electrolyte membrane roll 10 draws the polymer electrolyte membrane PEM to downstream by rotating. The polymer electrolyte membrane PEM that is drawn to travel downstream from the electrolyte membrane roll 10 is laminated so that a first catalyst layer 111 (refer to FIG. 4), in which a lower face that is one face of the first catalyst layer-including substrate GDE1 that is drawn to travel downstream from the first substrate roll 11 is formed on the lower face of the first catalyst layer including substrate GDE1, opposes a top face which is one face of the polymer electrolyte membrane PEM.

The first substrate roll 11 is a roll that prepares a continuous sheet-like (belt-like) first catalyst layer-including substrate (Gas Diffusion Electrode) GDE1, and rotates around a horizontal shaft at the upstream of the production line 1. This first substrate roll 11 draws the first catalyst layer-including substrate GDE1 from above the electrolyte membrane roll 10 to downstream by rotating. In the first catalyst layer-including substrate GDE1 that is drawn to travel downstream from the first substrate roll 11, the first catalyst layer 11 (refer to FIG. 4) is formed on the lower face, which is one side thereof. In addition, regarding the first catalyst layer-including substrate GDE1 that is drawn out to travel downstream from the first substrate roll 11, the first catalyst layer 111 which is at the bottom face that is one face thereof is laminated so as to oppose the top face which is one face of the polymer electrolyte membrane PEM that is drawn out to travel downstream from the electrolyte membrane roll 10.

The pair of upper/lower temporary bonding rolls 12, 13 is provided so that each is rotatable around a horizontal shaft, and the circumferences substantially contact each other at the downstream of the electrolyte membrane roll 10 and first substrate roll 11. This pair of upper/lower temporary bonding rolls 12, 13 is configured to be heatable and, by causing the polymer electrolyte membrane PEM and the first catalyst layer-including substrate GDE1 laminated vertically to pass therethrough, applies a vertical external force and heat to this polymer electrolyte membrane PEM and first catalyst layer-including substrate GDE1 while rotating, and bonds this polymer electrolyte membrane PEM and first catalyst layer-including substrate GDE1.

The first laser device 14 is provided downstream of the pair of upper/lower temporary bonding rolls 12, 13, so as to be movable in a horizontal direction above the first catalyst layer-including substrate GDE1 bonding to the top face of the polymer electrolyte membrane PEM by passing through this pair of upper/lower temporary bonding rolls 12, 13, and irradiates a laser beam LB1 towards the first catalyst layer-including substrate GDE1. This first laser device 14, by irradiating the laser beam LB1 towards the first catalyst layer-including substrate GDE1 while moving in the horizontal direction, makes cuts CL so that the first catalyst layer-including substrate GDE1 bonding with the polymer electrolyte membrane PEM becomes a predetermined shape (for example, rectangle).

The laser beam LB1 of the first laser device 14 is a wavelength that penetrates the polymer electrolyte membrane PEM without penetrating the first catalyst layer-including substrate GDE1, similarly to the laser beam LB2 of the second laser device 16 described later. The laser beam LB1 of this first laser device 14 preferably has transmittance relative to the polymer electrolyte membrane PEM of at least 80%, and more preferably at least 90%. In other words, as shown in FIG. 2, the wavelength of the laser beam LB1 of the first laser device 14 is preferably at least 400 nm, and more preferably at least 600 nm. More specifically, it is possible to use a YAG laser (wavelength 1064 nm).

In addition, as is evident from FIG. 2, the laser beam LB1 of the first laser device 14 has transmittance relative to carbon-based material of about 0% irrespective of the wavelength, similarly to the laser beam LB2 of the second laser device 16 described later. As described later, since the catalyst layer-including substrate is configured by carbon-based material, the laser beam LB1 of the first laser device 14 will be absorbed without penetrating the first catalyst layer-including substrate GDE1. Cutting or removal relative to the first catalyst layer-including substrate GDE1 thereby becomes possible by the laser beam LB1 of the first laser device 14.

The recovery roll 15 is a roll that recovers an unwanted portion GDE12 of the first catalyst layer-including substrate GDE1, and rotates around a horizontal shaft above the first catalyst layer-including substrate GDE1 downstream of the first laser device 14. This recovery roll 15 peels, from the polymer electrolyte membrane PEM, the unwanted portion GDE12 other than the portion GDE 11 of a predetermined shape (for example, rectangle) of the first catalyst layer-including substrate GDE1 in which the cuts CL were made by the laser beam LB1 of the first laser device 14, to recover this unwanted portion GDE 12 while winding up by rotating. It should be noted that the residual RD of the first catalyst layer-including substrate GDE 1 adheres on the polymer electrolyte membrane PEM after the unwanted portion GDE12 of the first catalyst layer-including substrate GDE1 has been peeled (refer to FIG. 3A).

The second laser device 16 is provided downstream of the first laser device 14, so as to be moveable in a horizontal direction above the polymer electrolyte membrane PEM from which the unwanted portion GDE12 of the first catalyst layer-including substrate GDE1 has been peeled, and irradiates a laser beam LB2 towards this polymer electrolyte membrane PEM. This second laser device 16, by irradiating the laser beam LB2 towards the portion of the polymer electrolyte membrane PEM to which the unwanted portion GDE12 of the first catalyst layer-including substrate GDE1 is bonded, while moving in the horizontal direction, removes the residual RD of the first catalyst layer-including substrate GDE1 adhering on the polymer electrolyte membrane PEM (refer to FIG. 3B).

The laser beam LB2 of the second laser device 16 is a wavelength that penetrates the polymer electrolyte membrane PEM without penetrating the first catalyst layer-including substrate GDE 1, similarly to the laser beam LB1 of the first laser device 14. The laser beam LB2 of this second laser device 16 preferably has a transmittance relative to the polymer electrolyte membrane PEM of at least 80%, and more preferably at least 90% (refer to FIG. 2). In other words, as shown in FIG. 2, the wavelength of the laser beam LB2 of the second laser device 16 is preferably at least 400 nm, and more preferably at least 600 nm. More specifically, it is possible to use a YAG laser (wavelength 1064 nm).

In addition, as is evident from FIG. 2, the laser beam LB2 of the second laser device 16 has transmittance relative to carbon-based material of about 0% irrespective of the wavelength, similarly to the laser beam LB1 of the first laser device 14. As described later, since the catalyst layer-including substrate is configured by carbon-based material, the laser beam LB2 of the second laser device 16 will be absorbed without penetrating the first catalyst layer-including substrate GDE1. Removing the residue RD of the first catalyst layer-including substrate GDE1 adhering on the polymer electrolyte membrane PEM thereby becomes possible by the laser beam LB2 of the second laser device 16.

The polymer electrolyte membrane PEM from which the residue RD of the first catalyst layer-including substrate GDE1 was removed by the laser beam LB2 of the second laser device 16 is laminated so that, opposing a lower face which is one face thereof, is a second catalyst layer 121 (refer to FIG. 4), in which a top face that is one face of the second catalyst layer-including substrate GDE2 that is drawn to travel downstream from the second substrate roll 17 is formed on the top face of the second catalyst layer including substrate GDE2.

The second substrate roll 17 is a roll that prepares the continuous sheet-like (belt-like) second catalyst layer-including substrate (Gas Diffusion Electrode) GDE2, and rotates around a horizontal shaft below the polymer electrolyte membrane PEM downstream of the second laser device 16. By rotating, this second substrate roll 17 draws out to downstream the second catalyst layer-including substrate GDE2 from below the polymer electrolyte membrane PEM, which is traveling. In the second catalyst layer-including substrate GDE2 that is drawn out to travel downstream from the second substrate roll 17, the second catalyst layer 121 (refer to FIG. 4) is formed on the top face which is one side thereof. In addition, regarding the second catalyst layer-including substrate GDE2 that is drawn out to travel downstream from the second substrate roll 17, the second catalyst layer 121 which is at the top face that is one face thereof is laminated so as to oppose the bottom face which is the other face of the polymer electrolyte membrane PEM from which the residue RD of the first catalyst layer-including substrate GDE1 was removed.

The pair of upper/lower bonding rolls 18, 19 is provided so that each is rotatable around horizontal shafts, and so that the circumferences substantially contact each other at the downstream of the second substrate roll 17. This pair of upper/lower bonding rolls 18, 19 is configured to be heatable and, by causing the portion GDE 11 of a predetermined shape of the first catalyst layer-including substrate GDE1, polymer electrolyte membrane PEM and second catalyst layer-including substrate GDE2 laminated vertically to pass therethrough from upstream to downstream, applies a vertical external force and heat to this portion GDE 11 of a predetermined shape of the first catalyst layer-including substrate GDE1, polymer electrolyte membrane PEM and second catalyst layer-including substrate GDE2 while rotating, and bonds this portion GDE 11 of a predetermined shape of the first catalyst layer-including substrate GDE1, polymer electrolyte membrane PEM and second catalyst layer-including substrate GDE2. In other words, the pair of upper/lower bonding rolls 18, 19 forms the second catalyst layer 121 on the lower face which is the other face of the polymer electrolyte membrane PEM.

The cutter 20 is provided downstream of the pair of upper/lower bonding rolls 18, 19 so as to be vertically moveable, above the portion GDE 11 of a predetermined shape of the first catalyst layer-including substrate GDE1, polymer electrolyte membrane PEM and second catalyst layer-including substrate GDE2, which are bonded together by passing through this pair of upper/lower bonding rolls 18, 19. This cutter 20 performs trimming such as cutting on the polymer electrolyte membrane PEM and second catalyst layer-containing substrate GDE2 by moving downwards. In other words, the cutter 20 punches out the polymer electrolyte membrane PEM and second catalyst layer-including substrate GDE2 on which the second catalyst layer 121 is formed, so that the first catalyst layer-including substrate GDE11 of a predetermined shape bonding to the top face which is one face of the polymer electrolyte membrane PEM is surrounded. A plurality of fuel cell membrane electrolyte assemblies MEAs is thereby completed.

Next, a method for producing a fuel cell membrane electrode assembly MEA of the present embodiment executed by the production line 1 will be explained while referencing FIG. 1.

The method for producing a fuel cell membrane electrode assembly MEA in the production line 1 includes a Step 1, Step 2, Step 3, Step 4, Step 5, Step 6, Step 7, Step 8, etc.

In Step 1, the polymer electrolyte membrane PEM is prepared. More specifically, the polymer electrolyte membrane PEM is drawn out to downstream from the electrolyte membrane roll 10.

In Step 2, the first catalyst layer-including substrate GDE1 on which the first catalyst layer 111 is formed on the lower face, which is one face of a continuous sheet-like (belt-like) substrate, is prepared. More specifically, in Step 2, the first catalyst layer-including substrate GDE1 is drawn out to downstream from the first substrate roll 11.

In Step 3, the first catalyst layer-including substrate GDE1 that is drawn out to travel from the first substrate roll 11 is laminated so that the first catalyst layer 111 opposes the top face which is one face of the polymer electrolyte membrane PEM that is drawn out to travel from the electrolyte membrane roll 10.

In Step 4, the polymer electrolyte membrane PEM and the first catalyst layer-including substrate GDE1, which are laminated to each other and travel, are bonded by the pair of upper/lower temporary bonding rolls 12, 13.

In Step 5, the cut CL is made so that the first catalyst layer-including substrate GDE1 bonding with the polymer electrolyte membrane PEM becomes a predetermined shape, by irradiating the laser beam LB1 of the first laser device 14.

In Step 6, the unwanted portion GDE 12 other than the portion GDE 11 of a predetermined shape of the first catalyst layer-including substrate GDE1 is peeled from the polymer electrolyte membrane PEM and recovered by the recovery roll 15.

In Step 7, to a portion of the polymer electrolyte membrane PEM to which the unwanted portion GDE12 is bonded, the laser beam LB2 of the second laser device 16 penetrating the polymer electrolyte membrane PEM without penetrating the first catalyst layer-including substrate GDE1 is irradiated, and the residue RD of the first catalyst layer-including substrate GDE1 adhering on the polymer electrolyte membrane PEM is removed.

In Step 8, using the second catalyst layer-including substrate GDE2 that is drawn to travel from the second substrate roll 17, the second catalyst layer 121 is formed on the lower face which is the other face of the polymer electrolyte membrane PEM by the pair of upper/lower bonding rolls 18, 19, and the polymer electrolyte membrane PEM and the second catalyst layer-including substrate GDE2 on which the second catalyst layer 121 is formed are punched out by the cutter 20 so that the first catalyst layer-including substrate GDE11 of a predetermined shape bonding on the top face which is the one face of the polymer electrolyte membrane PEM is surrounded. A plurality of fuel cell membrane electrolyte assemblies MEA is thereby completed.

Next, the structure of the fuel cell membrane electrode assembly MEA produced by the method for producing a fuel cell membrane electrode assembly MEA of the present embodiment executed by the production line 1 will be explained while referencing FIG. 4.

As shown in FIG. 4, the fuel cell membrane electrode assembly MEA has a structure made by sandwiching the polymer electrolyte membrane PEM between the first catalyst layer-including substrate GDE11 and the second catalyst layer-including substrate GDE2. The first catalyst layer-including substrate GDE11 is configured by a first diffusion layer 113, first intermediate layer 112, and first catalyst layer 111 being laminated in this order. The first diffusion layer 113 is configured by a porous media which is perforated in the thickness direction, and carbon paper containing carbon fiber and carbon binder is used, for example. The first intermediate layer 112 is configured to include an electron conducting material and a water-repellent resin, for example. The first catalyst layer 111 is configured to include catalyst particles made by loading a catalytic metal such as platinum on a catalyst support such as carbon black, and a polymer electrolyte such as an ion-conductive polymer binder. Similarly, the second catalyst layer-including substrate GDE2 is also configured by a second diffusion layer 123, second intermediate layer 122 and second catalyst layer 121 being laminated in this order. The second diffusion layer 123 is a configuration similar to the first diffusion layer 113, the second intermediate layer 122 is a configuration similar to the first intermediate layer 112, and the second catalyst layer 121 is a configuration similar to the first catalyst layer 111.

In addition, with the fuel cell membrane electrode assembly MEA, a step is formed at the periphery by the first catalyst layer-including substrate GDE11 being a rectangular shape with an area smaller than the second catalyst layer-including substrate GDE2 and polymer electrolyte membrane PEM. For this reason, one face (top face) of the polymer electrolyte membrane PEM has the peripheral edge exposed in a rectangular frame shape. The creepage distance of the first catalyst layer 111 and second catalyst layer 121 is assumed, and the insulation is ensured. The method for producing the fuel cell membrane electrode assembly MEA of the present embodiment executed by the production line 1 is appropriate in the production of MEAs having such a step.

Next, the insulation property before and after removing the residue RD of the first catalyst layer-including substrate GDE1 from on the polymer electrolyte membrane PEM will be explained while referencing FIG. 5. As shown in FIG. 5, the electrode residue part from which the residue RD has not been removed has a resistance value of 0 (MΩ), and the insulation of the first catalyst layer 111 and second catalyst layer 121 is not ensured. On the other hand, a cleaning part after the residue RD has been removed has a resistance value on the order of 5 (MΩ), and the insulation of the first catalyst layer 111 and second catalyst layer 121 is found to be ensured.

According to the method for producing a fuel cell membrane electrode assembly MEA of the present embodiment explained above, the following such effects are exerted.

The method for producing a fuel cell membrane electrode assembly MEA of the present embodiment, i.e. method for producing a fuel cell membrane electrode assembly MEA on the production line 1, is configured to include: Step 1 of preparing a polymer electrolyte membrane PEM; Step 2 of preparing a first catalyst layer-including substrate GDE1 made by a first catalyst layer 111 being formed on one face of a sheet-like substrate; Step 3 of laminating the first catalyst layer-including substrate GDE1 so that the first catalyst layer 111 opposes one face of the polymer electrolyte membrane PEM; Step 4 of bonding the polymer electrolyte membrane PEM and first catalyst layer-including substrate GDE1; Step 5 of making a cut CL so that the first catalyst layer-including substrate GDE1 bonded with the polymer electrolyte membrane PEM becomes a predetermined shape; Step 6 of peeling an unwanted portion GDE12 of the first catalyst layer-including substrate GDE1 other than a portion GDE11 of predetermined shape from the polymer electrolyte membrane PEM; Step 7 of irradiating a laser beam LB2 of the second laser device 16 that penetrates the polymer electrolyte membrane PEM without penetrating the first catalyst layer-including substrate GDE1 on a portion of the polymer electrolyte membrane PEM at which an unwanted portion GDE is bonded, and removing a residue RD of the first catalyst layer-including substrate GDE1 adhering on the polymer electrolyte membrane PEM; Step 8 of forming a second catalyst layer 121 on one other face of the polymer electrolyte membrane PEM, and punching out the polymer electrolyte membrane PEM and second catalyst layer 121 so that the first catalyst layer-including substrate GDE11 of predetermined shape bonded at one face is surrounded.

In summary, the present embodiment configures so as to peel the unwanted portion GDE12 after bonding the first catalyst layer-including substrate GDE1 only to one face of the polymer electrolyte membrane PEM, then remove the residue RD using the laser beam LB2 of the second laser device 16 penetrating the polymer electrolyte membrane PEM without penetrating the first catalyst layer-including substrate GDE1, followed by forming the second catalyst layer 121 on the other face. Due to forming the second catalyst layer 121 on the other face after removing the residue RD in this way, the second catalyst layer 121 will not be removed by the laser beam LB2 penetrating the polymer electrolyte membrane PEM. Therefore, according to the present embodiment, it is possible to prevent the required catalyst layer from being removed, while suppressing damage to the electrolyte membrane.

In addition, in the present embodiment, the laser beam LB2 of the second laser device 16 is set to have a transmittance relative to the polymer electrolyte membrane PEM of at least 80%. It is thereby possible to more reliably suppress damage to the polymer electrolyte membrane PEM by using a high transmittance laser beam.

The present invention is not to be limited to the above-mentioned embodiment, and modifications, improvements, etc. in a scope that can achieve the object of the present invention are also included in the present embodiment.

EXPLANATION OF REFERENCE NUMERALS 1 production line
10 electrolyte membrane roll
11 first substrate roll
12, 13 temporary bonding roll
14 first laser device
15 recovery roll
16 second laser device
17 second substrate roll
18, 19 bonding roll
20 cutter
111 first catalyst layer
121 second catalyst layer
MEA fuel cell membrane electrode assembly
LB1, LB2 laser beam (energy ray)
PEM polymer electrolyte membrane
GDE1 first catalyst layer-including substrate
GDE11 portion of predetermined shape of first catalyst layer-including substrate
GDE12 unwanted portion of first catalyst layer-including substrate
CL cut
RD residue
GDE2 second catalyst layer-including substrate

What is claimed is:

1. A method for producing a fuel cell membrane electrode assembly comprising the steps of:
   preparing an electrolyte membrane;
   preparing a catalyst layer-including substrate in which a first catalyst layer is formed on one face of a sheet-like substrate;
   laminating the catalyst layer-including substrate so that the first catalyst layer opposes one face of the electrolyte membrane;
   bonding the electrolyte membrane and the catalyst layer-including substrate;
   making a cut so that the catalyst layer-including substrate bonded with the electrolyte membrane becomes a predetermined shape;
   peeling an unwanted portion of the catalyst layer-including substrate other than the predetermined shape portion from the electrolyte membrane;
   irradiating energy rays that penetrate the electrolyte membrane without penetrating the catalyst layer-including substrate onto a portion of the electrolyte membrane to which the unwanted portion is bonded, and removing residue of the catalyst layer-including substrate adhering on the electrolyte membrane; and
   forming a second catalyst layer on one other face of the electrolyte membrane, and punching out the electrolyte membrane and the second catalyst layer so that the catalyst layer-including substrate of the predetermined shape bonded to the one face is surrounded.

2. The method for producing a fuel cell membrane electrode assembly according to claim 1, wherein the energy rays have a transmittance relative to the electrolyte membrane of at least 80%.

* * * * *